United States Patent [19]

May

[11] Patent Number: 5,259,717
[45] Date of Patent: Nov. 9, 1993

[54] CONVEYING APPARATUS FOR ASPHALTIC MIX AND THE LIKE

[75] Inventor: James G. May, Hixson, Tenn.

[73] Assignee: Astec Industries, Inc., Chattanooga, Tenn.

[21] Appl. No.: 863,211

[22] Filed: Apr. 3, 1992

[51] Int. Cl.[5] ............................................. B65G 19/06
[52] U.S. Cl. ................................... 414/332; 198/719; 198/716; 366/186; 414/528; 414/21; 414/919
[58] Field of Search ............... 414/332, 919, 528, 567, 414/570, 397, 398, 21; 198/716, 728, 733, 719; 366/186

[56] References Cited

U.S. PATENT DOCUMENTS

| | | | |
|---|---|---|---|
| 391,223 | 10/1888 | Berger | 198/719 |
| 3,756,379 | 9/1973 | Rheinfrank, Jr. | 198/719 |
| 4,400,126 | 8/1983 | Desourdy | 414/332 |
| 4,943,200 | 7/1990 | Edwards et al. | 414/332 |

FOREIGN PATENT DOCUMENTS 1238395  4/1967  Fed. Rep. of Germany ...... 198/716

OTHER PUBLICATIONS

"The Storage Bin" brochure of Astec Industries, Inc., cover and 5 pages, 1991.

*Primary Examiner*—Frank E. Werner
*Attorney, Agent, or Firm*—Nilles & Nilles

[57] ABSTRACT

An asphaltic mix storage system has an improved conveying apparatus including a housing which is upwardly inclined from the horizontal so as to extend from approximately ground level to the top of a storage container. The conveying apparatus also includes a drag-type conveyor in the housing comprising an endless conveyor chain having spaced apart conveying blades carried thereby with the lower edges of the conveying blades in sliding engagement with the lower wall of the housing. The forward faces of the conveying blades and the lower wall of the housing define an acute angle therebetween to prevent carryover of asphaltic mix beyond the discharge chute at the upper end of the apparatus.

9 Claims, 2 Drawing Sheets

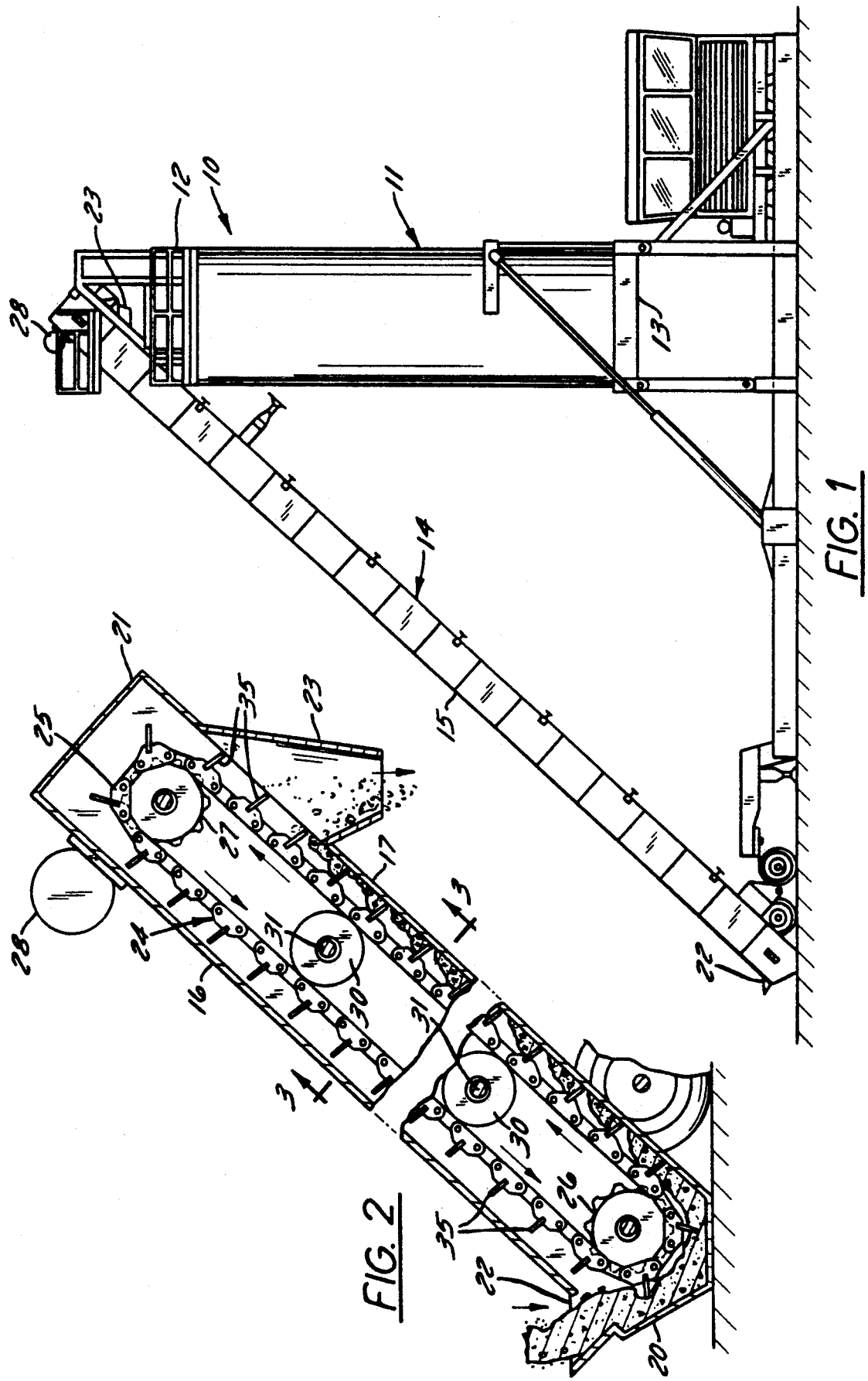

CONVEYING APPARATUS FOR ASPHALTIC MIX AND THE LIKE

FIELD OF THE INVENTION

The present invention relates to a storage system for storing and dispensing asphaltic mix and the like and more particularly to a conveying apparatus for conveying asphaltic mix to be stored and dispensed.

BACKGROUND OF THE INVENTION

When paving highways with asphaltic mix, it is desirable to provide a storage system for the mix as near as possible to the construction site to enhance accessibility and efficiency. To meet this objective, storage systems of various configurations have been proposed. These storage systems include an elongate, generally upright storage and dispensing container which stores and thereafter dispenses the asphaltic mix when required. The storage systems also include an upwardly inclined conveying apparatus for conveying asphaltic mix from substantially ground-level up to the top of the storage container to fill the storage container with asphaltic mix and to replenish the supply in the storage container as needed.

Heretofore, these conveying apparatus provide a hopper for receipt of the asphaltic mix substantially at ground-level and a discharge chute for depositing the asphaltic mix in the storage container at the other end of the conveying apparatus. A drag-type conveyor extends between the hopper and the discharge chute and generally includes a chain conveyor having spaced apart flights or blades carried thereby which are perpendicular to the lower wall of the housing and thus act to drag the asphaltic mix upwardly within the housing between the hopper and the discharge chute.

Such previous conveying apparatus, while generally successful, have certain disadvantages and deficiencies. Typical among such disadvantages and deficiencies is the propensity for the conveying blades or flights to carry asphaltic mix on the forward faces of the blades past the discharge chute and around the sprocket mounting the upper end of the conveyor chain. Such carryover asphaltic mix then falls downwardly into the sprocket or onto the chain supporting idler rollers which result in the sprocket or rollers becoming fouled with asphaltic mix. Such fouling of the sprocket and/or rollers results in increased wear, lower efficiency, and early replacement of these parts of the conveying apparatus due to the increased wear.

It is accordingly an object of the present invention to provide an asphaltic storage system having an improved conveying apparatus which overcomes the problems and deficiencies of previous asphaltic storage systems.

It is a more specific object of the present invention to provide an improved conveying apparatus for an asphaltic storage system which overcomes the problem of asphaltic mix carryover.

SUMMARY OF THE PRESENT INVENTION

These and other objects and advantages of the present invention are achieved in the embodiment illustrated herein by the provision of an improved conveying apparatus which comprises an endless conveyor chain extending throughout the length of a housing and cooperating with the housing for conveying the asphaltic material from one end of the housing to the other end for deposit in a storage container. The endless conveyor chain has a plurality of spaced-apart flights or conveying blades carried thereby. The lower edges of the flights or conveying blades are in sliding engagement with the lower wall of the housing. The forward faces of the flights or conveying blades define an acute angle with the lower wall of the housing whereby carryover of asphaltic mix around the end of the conveyor is substantially prevented.

BRIEF DESCRIPTION OF THE DRAWINGS

FIG. 1 is a side elevational view of the asphaltic material storage system of the present invention;

FIG. 2 is an enlarged fragmentary sectional view of the conveying apparatus of the asphaltic storage system shown in FIG. 1;

DETAILED DESCRIPTION OF THE PREFERRED EMBODIMENT

Figure 3:
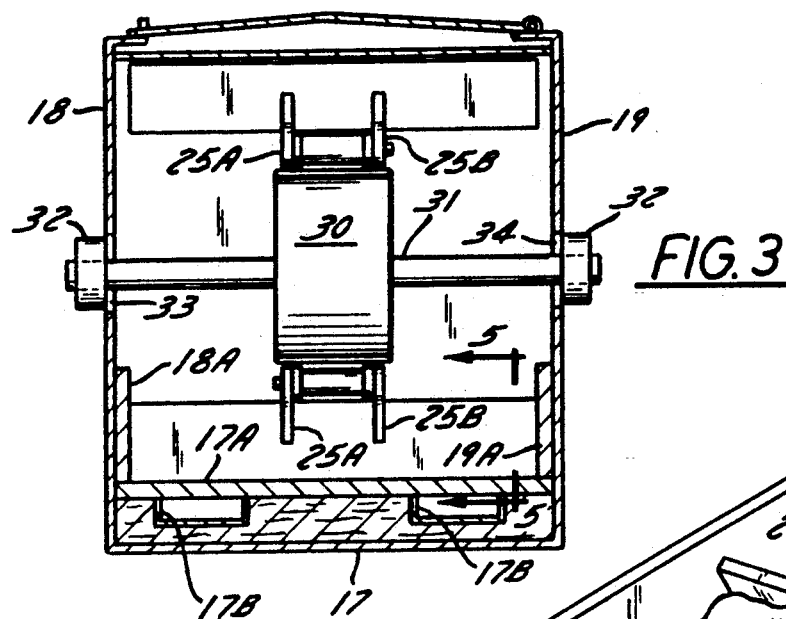
FIG. 3 is an enlarged transverse sectional view taken substantially along line 3—3 in FIG. 2 and showing the conveying apparatus in more detail.

Referring more particularly to the drawings, a preferred embodiment of the present invention is illustrated and comprises a storage system generally indicated at 10 for temporarily storing and then dispensing asphaltic mix and the like. The storage system 10 includes a generally upright, elongate storage container 11 having an asphaltic mix receiving portion 12 at its upper end and an asphaltic mix dispensing portion 13 at its lower end. A conveying apparatus 14 is provided for conveying asphaltic mix from substantially ground-level to the receiving upper portion 12 of storage container 11.

Preferably, storage system 10 is generally of the type disclosed in U.S. Pat. No. 4,943,200, issued Jul. 24, 1990, to the assignee of this application. Accordingly, the disclosure of U.S. Pat. No. 4,943,200 is incorporated herein by reference.

Figure 4:
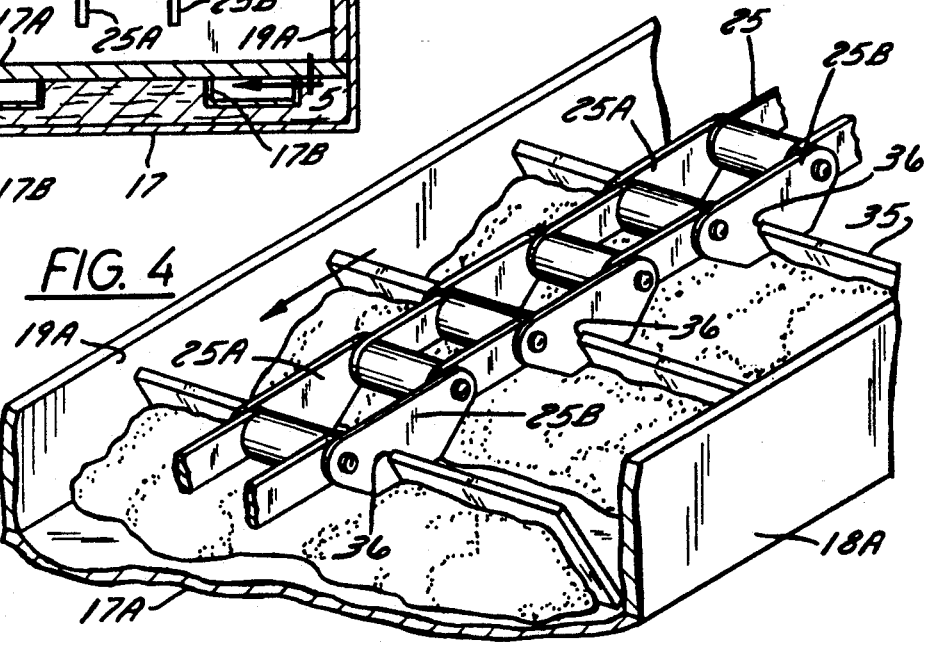
FIG. 4 is an enlarged fragmentary perspective view showing a portion of the conveyor chain of the conveyor system within the housing.
Figure 5:
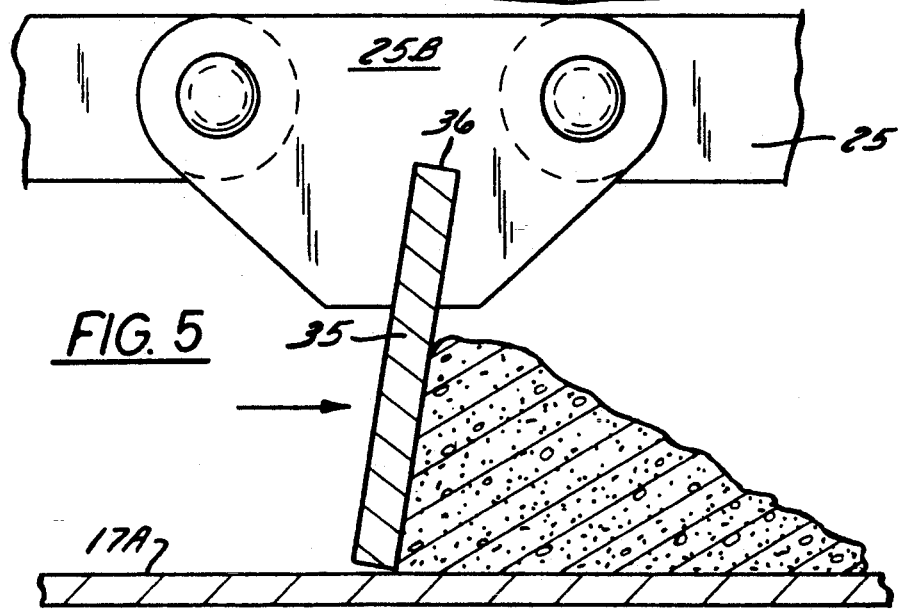
FIG. 5 is an enlarged fragmentary sectional view taken substantially along line 5—5 in FIG. 3.

Conveying apparatus 14 comprises a housing 15 having upper, lower and side walls 16, 17, 18 and 19, respectively, defining an enclosed passageway through which the asphaltic mix is conveyed. Housing 15 has a lower end wall 20 and an upper end wall 21 that closes off opposite ends of the material conveying passageway. Preferably, the lower wall 17 includes a wear-resistant lining plate 17A, and side walls 18 and 19 include wear-resistant lining plates 18A and 19A respectively (FIGS. 3 and 4) to increase the effective life of conveying apparatus 14. A pair of heating tubes 17B may be positioned between the lower wall 17 and the plate 17A as seen in FIG. 3, which are filled with hot oil to keep the mix at proper temperature. Also, the space surrounding the tubes 17B may be filled with a suitable insulating material.

Housing 15 has a hopper 22 at its lower end and a discharge chute 23 at its upper end portion for the receipt and discharge of the asphaltic mix from the conveyor apparatus. The discharge chute 23 is positioned in operative association with the upper receiving portion 12 of storage container 11 for delivering asphaltic material to storage container 11.

Housing 15 may be positioned relative to storage container 11 so as to define any suitable angle from horizontal. In the illustrated embodiment, the housing 15 defines an angle of approximately 45 degrees to horizontal.

An improved conveyor means 24 is mounted in housing 15 and comprises an endless conveyor chain 25 trained about end sprockets 26 and 27 at its respective lower and upper ends. At least one of the sprockets 26 and 27 is driven by a suitable driving means 28 (FIGS. 1 and 2). Hold down rollers 30 are mounted on shafts 31 which in turn are journalled at opposite ends in bearings 32 mounted on side walls 18 and 19. Hold down rollers 30 are preferably mounted in slots 33 in side wall 18 and slots 34 in side wall 19 such that the hold down rollers 30 may float up and down to prevent rollback and hydroplaning. Conveyor chain 25 has tension adjusters (not shown) to maintain proper tension in chain 25. The tension in the chain, the weight of the hold down rollers 30 and the weight of the upper run of conveyor chain 25 all serve to hold the conveyor chain 25 in proper conveying position with respect to the lower wall 17 of the housing 15. The typical length of conveyor chain 25 is from 80 to 100 feet and the hold down rollers 30 are preferably positioned approximately every 5 feet along the length of the conveyor chain 25.

A plurality of flights or conveying blades 35 are carried by conveyor chain 25 with the lower edges of the conveying blades 35 on the lower run of conveyor chain 25 in sliding engagement with the plate 17A adjacent the lower wall 17 of housing 15. Conveying blades 35 are preferably rectangular with a length sufficient to span the distance between side walls 18 and 19 of the housing 15. These conveying blades 35 are usually provided in either 24 or 36 inch lengths. The height or depth of the blades 35 may also be any desired amount consistent with the amount of material to be conveyed and the bending loads thereon. Preferably, conveying blades 35 will be approximately 7 inches high or deep.

Conveying blades 35 are mounted on the links of conveyor chain 25 in any suitable manner. As illustrated, conveying blades 35 are mounted on every other link of chain 25 by having the upper portion thereof received in slots 36 in the side pieces 25a, 25b of the links of chain 25. Blades 35 are secured in slots 36 by any suitable means, such as welding (not shown).

Conveying blades 35 are mounted on conveying chain 35 such that the forward faces of conveying blades 35 form an acute angle with the plate 17A of the lower wall 17 of housing 15. This acute angle is such that both asphaltic mix carryover and hydroplaning are prevented. It is believed that an acute angle between about 75 and 85 degrees will prevent any substantial carryover of asphaltic mix while also preventing hydroplaning. Preferably, the acute angle should be about 80 degrees when the conveying apparatus 14 has the indicated inclination.

In operation, conveying apparatus 14 is positioned in operative association with storage container 11 and asphaltic mix and the like is deposited in the hopper 22 from a suitable supply means (not shown). Conveyor chain 25 is then driven so that the conveying blades 35 pick up the asphaltic mix from hopper 22 and drag the asphaltic mix upwardly along the upper surface of plate 17A of housing 15. When the conveying blades 35 reach the discharge chute 23, the asphaltic mix is deposited in the discharge chute and thence falls by gravity into the upper receiving portion 12 of storage container 11. Because of the forward incline of the conveying blades 35 defining the acute angle with plate 17A, the asphaltic mix is not carried over the discharge chute 23, but all of the asphaltic material is deposited in chute 23. Hydroplaning is substantially prevented by the selection of the proper acute angle and the floating action of the hold down rollers 30.

In the figures and specification, there has been disclosed a preferred embodiment of the invention. While specific terms are employed, they are used in a generic and descriptive sense only, and not for purposes of limiting the scope of the invention as set forth in the following claims.

That which is claimed is:

1. In a storage apparatus for temporarily storing and dispensing asphaltic mix and the like including a generally vertically oriented, elongate material storage container for receiving, storing and dispensing the asphaltic mix and the like, and with said storage container having an upper inlet position, the improvement which comprises material conveying means for conveying asphaltic mix into the upper inlet portion of said storage container for storage and dispensing, said conveying means comprising
   (a) an elongate housing having upper, lower and side walls extending from substantially ground level to the upper inlet portion of said storage container and with said housing defining a lower end and an upper end, and further having a hopper at its lower end for receipt of material to be conveyed and a discharge chute at its upper end communicating with the upper inlet portion of said storage container; and
   (b) drag-type conveyor means mounted in said housing and cooperating therewith for conveying material upwardly along the lower wall of said housing between said hopper and said discharge chute, said conveyor means comprising a driven endless conveyor chain entrained about lower and upper end sprockets which are mounted adjacent the lower end and upper end of said housing respectively, and with said conveyor chain having a plurality of spaced apart conveying blades carried thereby with said blades each including a lower edge which is in sliding engagement with the lower wall of said housing for dragging material upwardly along said lower wall as said chain is driven, each of said conveying blades further including a forward face which faces toward said upper end of said housing as an associated blade moves along the lower wall of said housing, and with each of said conveying blades defining an acute angle between the forward face thereof and the lower wall off said housing, whereby the material is conveyed upwardly along said lower wall of said housing and is delivered into said discharge chute without substantial carryover of the material around the upper end sprocket of said conveyor means.

2. A storage assembly according to claim 1 wherein said conveyor blades extend substantially between said side walls of said housing.

3. A storage assembly according to claim 1 wherein said housing is inclined upwardly at an angle of about 45° and said acute angle between the forward faces of said conveying blades and said lower wall of said housing is between about 75 to 85 degrees.

4. A storage assembly according to claim 3 wherein said acute angle is about 80 degrees.

5. A storage assembly according to claim 1 wherein said conveyor means includes means for preventing hydroplaning of said conveying blades as the blades move along said lower wall of said housing toward said discharge chute.

6. In a storage apparatus for temporarily storing and dispensing asphaltic mix and the like including a generally vertically oriented, elongate material storage container for receiving, storing and dispensing the asphaltic mix and the like, and with said storage container having an upper inlet portion, the improvement which comprises material conveying means for conveying asphaltic mix into the upper inlet portion of said storage container for storage and dispensing, said conveying means comprising (a) an elongate housing having upper, lower and side walls and being upwardly inclined so as to extend from substantially ground level to the upper inlet portion of said storage container and with said housing defining a lower end and an upper end, and further having a hopper at its lower end for receipt of material to be conveyed and a discharge chute at its upper end communicating with the upper inlet portion of said storage container; and (b) drag-type conveyor means mounted in said housing and cooperating therewith for conveying material upwardly along the lower wall of said housing between said hopper and said discharge chute, said conveyor means comprising a driven endless conveyor chain entrained about lower and upper end sprockets which are mounted adjacent the lower end and upper end of said housing respectively, and with said conveyor chain having a plurality of spaced apart conveying blades carried thereby and extending substantially between said side walls of said housing, said conveying blades having lower edges thereof in sliding engagement with the lower wall of said housing for dragging the material upwardly along said lower wall as said chain is driven, each of said conveying blades further including a forward face which faces toward said upper end of said housing as an associated blade moves along the lower wall of said housing, and with each of said conveying blades defining an acute angle between the forward face thereof and the lower wall of said housing of about 80 degrees, whereby the material is conveyed upwardly along said lower wall of said housing and is delivered into said discharge chute without substantial carryover of the material around the upper end sprocket of said conveyor means.

7. A conveyor for conveying asphaltic mix and the like comprising (a) an elongate housing having upper, lower and side walls defining an asphaltic mix conveying passageway and with said housing defining a lower end and an upper end, and further having a hopper at said lower end and a discharge chute at said upper end thereof; and (b) drag-type conveying means mounted in said housing and extending between said hopper and said discharge chute for conveying asphaltic mix from said hopper to said discharge chute, said conveying means comprising a driven endless conveyor chain entrained about lower and upper end sprockets which are mounted adjacent the lower end and upper end of said housing respectively, and with said conveyor chain having a plurality of spaced apart conveying blades carried thereby with said blades each including a lower edge which is in sliding engagement with said lower wall of said housing for dragging the asphaltic mix along said lower wall, each of said conveying blades further including a forward face which faces toward said upper end of said housing as an associated blade moves along the lower wall of said housing, and with each of said conveying blades defining an acute angle between the forward face thereof and said lower wall of said housing, whereby the asphaltic mix is conveyed along said lower wall and is delivered into said discharge chute without substantial carryover of the asphaltic mix around the upper end sprocket of said conveyor means.

8. A conveyor according to claim 7 wherein said acute angle between the forward faces thereof and said lower wall of said housing is between about 75 to 85 degrees.

9. A conveyor according to claim 8 wherein said acute angle is about 80 degrees.

* * * * *